3,121,745
PROPYNLY p-NITROANILINES
Chester E. Pawloski, Bay City, Mich., assignor to The Dow Chemical Company, Midland, Mich., a corporation of Delaware
No Drawing. Filed Mar. 23, 1961, Ser. No. 97,740
3 Claims. (Cl. 260—577)

This invention is concerned with the propynyl p-nitroanilines corresponding to the formula

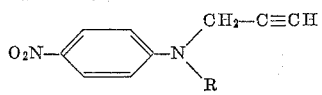

wherein R represents hydrogen or 2-propynyl. These compounds are crystalline solid materials which are somewhat soluble in many common organic solvents and of very low solubility in water. The compounds are useful as parasiticides for the control of the growth and killing of a number of insect, bacterial and fungal organisms such as flies, aphids, worms, beetles and mites.

The new propynyl p-nitroanilines are prepared by reacting propargyl bromide or propargyl chloride with p-nitroaniline. The reaction is carried out in a reaction medium such as acetone, diethyl ether, benzene or pentane and in the presence of a halide acceptor which may be an excess of the p-nitroaniline reagent and conveniently a basic material such as an alkali metal carbonate. The reaction takes place smoothly at the temperature range of from about 40°–100° C. with the production of the desired product and halide of reaction, which halide appears in the reaction mixture as the salt of the aniline reagent or of the metal in the employed base. Good results are obtained when reacting about one molecular proportion of p-nitroaniline with about one molecular proportion of propargyl halide in the presence of about one molecular proportion of the halide acceptor. Where optimum yields of N,N-di-(2-propynyl) p-nitroaniline are desired, it is preferred to react at least two molecular proportions of propargyl halide with one molecular proportion of p-nitroaniline. For optimum yields of N-(2-propynyl) p-nitroaniline, substantially equimolecular proportions of propargyl halide and p-nitroaniline are employed. In such preferred operations, the halide acceptor is employed in an amount substantially equimolecular with the employed amount of propargyl halide. Upon completion of the reaction, the desired products may be separated in conventional manner such as washing with water, filtration and decantation.

In carrying out the reaction, the propargyl halide, p-nitroaniline and basic material are dispersed in the reaction medium and the resulting mixture maintained for a period of time at a temperature of from about 40°–100° C. The reaction mixture conveniently is then washed with water and the washed mixture subsequently filtered to obtain the desired product as a crystalline residue.

In a representative operation, 138 grams (1 mole) of p-nitroaniline, 120 grams (1 mole) of propargyl bromide and 140 grams (1 mole) of potassium carbonate were dispersed in 325 milliliters of acetone and the resulting mixture heated with stirring at the boiling temperature and under reflux for 24 hours. The reaction mixture was then washed with water and the washed product filtered to obtain a crystalline residue. This residue was fractionally recrystallized from ethanol to obtain an N-(2-propynyl) p-nitroaniline product melting at 147°–149° C. and an N,N-di-(2-propynyl) p-nitroaniline product melting at 86°–87° C.

The novel products of the present invention are useful as parasiticides for the control of a number of pests. For such use, the products may be dispersed on an inert finely divided solid and employed as a dust. Such mixtures also may be dispersed in water with or without the aid of a surface active agent, and employed as sprays. In other procedures, the products may be employed as active constituents in solvent solutions, oil-in-water or water-in-oil emulsions or aqueous dispersions. In representative operations, aqueous compositions containing 250 parts per million by weight of N,N-di-(2-propynyl) p-nitroaniline give 100 percent kills of house flies. In further operations, this same aniline compound gives 100 percent kills of *Pullularia pullulans* at a concentration of 500 parts per million by weight.

I claim:
1. A compound selected from the group consisting of N-(2-propynyl) p-nitroaniline and N,N-di-(2-propynyl) p-nitroaniline.
2. N-(2-propynyl) p-nitroaniline.
3. N,N-di-(2-propynyl) p-nitroaniline.

References Cited in the file of this patent
Wolf: Justus Liebig's Annalen der Chemie, Band 576, page 36 (1952).